(12) United States Patent
Omi

(10) Patent No.: US 7,568,531 B2
(45) Date of Patent: Aug. 4, 2009

(54) GEAR TRANSMISSION DEVICE FOR POWER TOOL

(75) Inventor: Shohei Omi, Anjo (JP)

(73) Assignee: Omi Kogyo Co., Ltd. (JP)

( * ) Notice: Subject to any disclaimer, the term of this patent is extended or adjusted under 35 U.S.C. 154(b) by 52 days.

(21) Appl. No.: 11/083,165

(22) Filed: Mar. 16, 2005

(65) Prior Publication Data

US 2005/0230133 A1    Oct. 20, 2005

(30) Foreign Application Priority Data

Apr. 15, 2004  (JP) ............................. 2004-120492

(51) Int. Cl.
*F16H 57/10* (2006.01)

(52) U.S. Cl. .................. 173/216; 173/140; 173/40; 173/41; 173/26

(58) Field of Classification Search ................. 173/216, 173/140, 26, 40, 41; 81/57, 57.11, 464; 408/124; 73/421 R
See application file for complete search history.

(56) References Cited

U.S. PATENT DOCUMENTS

| | | | | | |
|---|---|---|---|---|---|
| 3,768,577 | A | * | 10/1973 | Leoni | 173/93 |
| 3,779,090 | A | * | 12/1973 | Ostenberg et al. | 74/81 |
| 3,797,497 | A | * | 3/1974 | Crim et al. | 606/173 |
| 3,803,931 | A | * | 4/1974 | Bianchini et al. | 74/117 |
| 3,845,642 | A | * | 11/1974 | Cochran | 68/23.7 |
| 3,888,139 | A | * | 6/1975 | Orshansky, Jr. | 475/75 |
| 4,130,172 | A | * | 12/1978 | Moody | 180/65.6 |
| 4,255,952 | A | * | 3/1981 | Johnson | 68/23.7 |
| RE32,125 | E | * | 4/1986 | Von Kaler et al. | 74/371 |
| 4,614,134 | A | * | 9/1986 | Bohle | 475/125 |
| 4,619,162 | A | * | 10/1986 | Van Laere | 81/464 |
| 4,725,043 | A | * | 2/1988 | Atfield et al. | 254/354 |
| 4,966,057 | A | * | 10/1990 | Koppatsch | 81/469 |
| 4,971,156 | A | * | 11/1990 | Wong | 173/178 |
| 5,011,341 | A | * | 4/1991 | DeGroff | 408/124 |
| 5,178,046 | A | * | 1/1993 | Matsumoto et al. | 81/57.14 |
| 5,207,697 | A | * | 5/1993 | Carusillo et al. | 606/167 |
| 5,269,733 | A | * | 12/1993 | Anthony, III | 475/331 |
| 5,390,561 | A | | 2/1995 | Stine | |

(Continued)

FOREIGN PATENT DOCUMENTS

CN    2055072 U    3/1990

(Continued)

OTHER PUBLICATIONS

Chinese Office Action for 200510056805.9, Issued Feb. 2, 2007; 10 pages.

(Continued)

*Primary Examiner*—Brian D Nash
(74) *Attorney, Agent, or Firm*—Sheridan Ross P.C.

(57) ABSTRACT

A gear transmission device for a power tool. The device transmits rotation of an input shaft to an output shaft, which are coaxially rotated. The input shaft includes a distal portion, and the output shaft includes a basal portion facing towards the distal portion of the input shaft. The gear transmission device includes a support arranged on one of the distal portion of the input shaft and the basal portion of the output shaft. A socket is arranged in the other one of the distal portion of the input shaft and the basal portion of the output shaft. The socket includes a hollow portion for rotatably accommodating the support.

7 Claims, 2 Drawing Sheets

U.S. PATENT DOCUMENTS

| | | | |
|---|---|---|---|
| 5,946,971 A | 9/1999 | Toyota et al. | |
| 6,029,532 A * | 2/2000 | Phillips | 74/421 R |
| 6,202,759 B1 * | 3/2001 | Chen | 173/48 |
| 6,223,834 B1 * | 5/2001 | Takamura et al. | 173/93.5 |
| 6,550,546 B2 * | 4/2003 | Thurler et al. | 173/48 |
| 6,789,631 B1 * | 9/2004 | Realme et al. | 173/162.2 |
| 6,893,371 B2 * | 5/2005 | Mills et al. | 475/149 |
| 6,966,391 B2 * | 11/2005 | Tang | 173/216 |
| 6,983,810 B2 * | 1/2006 | Hara et al. | 173/176 |
| 2005/0028996 A1 * | 2/2005 | Toukairin et al. | 173/176 |

FOREIGN PATENT DOCUMENTS

CN      1100500      3/1995

OTHER PUBLICATIONS

Office Action for corresponding Chinese patent application, dated Nov. 9, 2007, 2 pages.

* cited by examiner

GEAR TRANSMISSION DEVICE FOR POWER TOOL

BACKGROUND OF THE INVENTION

The present invention relates to a gear transmission device for a power tool, and more particularly, to a gear transmission device for coaxially rotating a drive shaft and a driven shaft.

In the prior art, a gear transmission device includes a drive shaft integrally attached to a drive gear, a driven shaft integrally attached to a driven gear, and a reduction gear connecting the two shafts. The drive shaft is supported by drive bearings. The driven shaft is supported by driven bearings.

In the prior art gear transmission device, when the drive shaft and the driving shaft are coaxially aligned with each other, the drive shaft bearings and the driven shaft bearings are arranged between the drive gear and the driven gear. This arrangement increases the distance between the drive gear and driven gear and enlarges the gear transmission device in the axial direction of the drive shaft.

SUMMARY OF THE INVENTION

It is an object of the present invention to provide a gear transmission device that enables the size of a power tool to be reduced.

One aspect of the present invention is a gear transmission device for transmitting rotation of an input shaft, having a rotation axis, to an output shaft and coaxially rotating the output shaft and the input shaft. The gear transmission device includes a first rotation mechanism including the input shaft and a drive gear rotated integrally with the input shaft. A second rotation mechanism includes the output shaft and a driven gear rotated integrally with the output shaft. A support is arranged on one of the first and second rotation mechanisms. A socket is arranged in the other one of the first and second rotation mechanisms and includes a hollow portion for rotatably receiving the support.

Another aspect of the present invention is a gear transmission device for transmitting rotation of an input shaft, having a rotation axis, to an output shaft and coaxially rotating the output shaft and the input shaft. The input shaft includes a distal portion, and the output shaft includes a basal portion facing towards the distal portion of the input shaft. The gear transmission device includes a support arranged on one of the distal portion of the input shaft and the basal portion of the output shaft. A socket is arranged in the other one of the distal portion of the input shaft and the basal portion of the output shaft and includes a hollow portion for rotatably receiving the support.

A further aspect of the present invention is a power tool for use with a tool member. The power tool includes a chuck for detachably fixing the tool member. A motor rotates the chuck. An input shaft is rotated in cooperation with the motor. An output shaft is rotated in cooperation with the chuck. A gear transmission device arranged between the input shaft and the output shaft transmits rotation of the input shaft to the output shaft and coaxially rotates the output shaft and the input shaft. The gear transmission device includes a first rotation mechanism including the input shaft and a drive gear rotated integrally with the input shaft. A second rotation mechanism includes the output shaft and a driven gear rotated integrally with the output shaft. A support is arranged on one of the first and second rotation mechanisms. A socket is arranged in the other one of the first and second rotation mechanisms and includes a hollow portion for rotatably receiving the support.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A power tool including a gear transmission device according to a first embodiment of the present invention will now be discussed.

Figure 1:
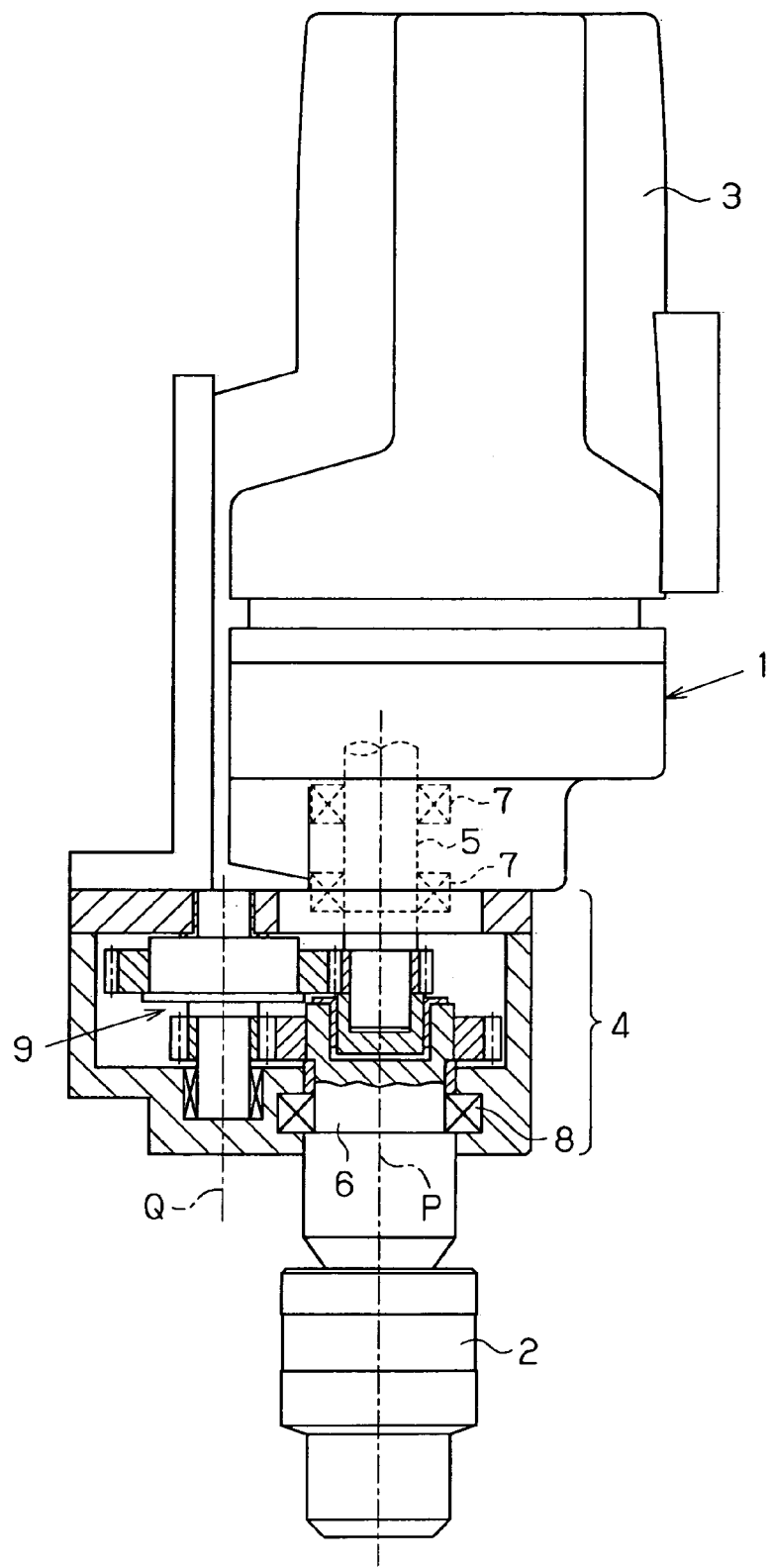
FIG. 1 is a partial cross-sectional view of a power tool including a reduction gear mechanism according to a first embodiment of the present invention.
Figure 2:
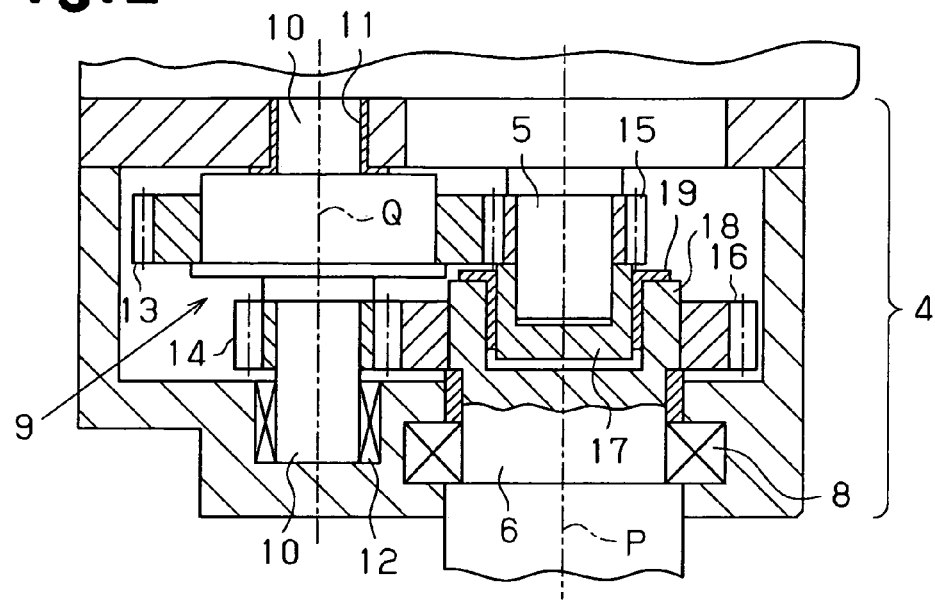
FIG. 2 is an enlarged cross-sectional diagram of the reduction gear mechanism shown in FIG. 1.
Figure 3:
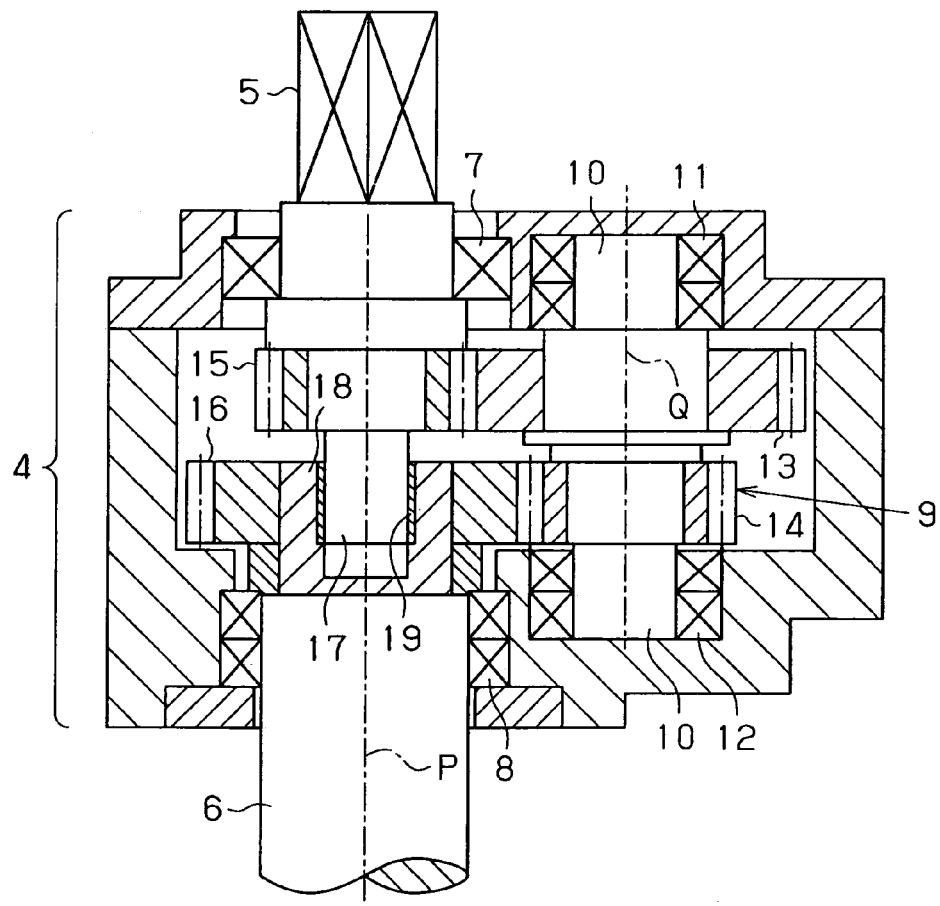
FIG. 3 is a cross-sectional diagram of a reduction gear mechanism according to a second embodiment of the present invention.

As shown in FIG. 1, a power tool 1 includes a chuck 2, a motor 3 for generating drive force that rotates the chuck 2, and a gear transmission device 4 arranged between the chuck 2 and the motor 3 to transmit the drive force of the motor 3 to the chuck 2. A tool member, such as a drill bit and a screw bit (not shown), is detachably fixed to the chuck 2. The gear transmission device 4 includes a reduction gear mechanism for reducing the speed of the rotation generated by the motor 3 to rotate the chuck 2 at the reduced speed. In one embodiment, the power tool 1 is a portable type. In another embodiment, the power tool 1 is a machining tool.

The gear transmission device 4 includes a drive shaft (input shaft) 5 rotated in cooperation with the motor 3, a driven shaft (output shaft) 6 rotated integrally with the chuck 2, drive bearings 7 rotatably supporting the drive shaft 5, a driven bearing 8 for rotatably supporting the driven shaft 6, and a gear unit 9 (reduction gear).

The drive shaft 5 and the driven shaft 6 are aligned along the same rotation axis P. A drive gear 15 supported by the drive shaft 5 rotates integrally with the drive shaft 5. A driven gear 16 supported by the driven shaft 6 rotates integrally with the driven shaft 6.

The gear unit 9 transmits the rotation of the drive shaft 5 to the driven shaft 6. The gear unit 9 includes a cooperation shaft 10, having a rotation axis Q, and first and second reduction gears 13 and 14 attached integrally to the cooperation shaft 10. The rotation axis Q is parallel to the rotation axis P of the drive and driven shafts 5 and 6. The cooperation shaft 10 is rotatably supported by bearings 11 and 12. In the first embodiment, the first reduction gear 13, the second reduction gear 14, the drive gear 15, and the driven gear 16 are all spur gears. Further, the drive shaft 5 and the drive gear 15 function as a first rotation mechanism, and the driven shaft 6 and the driven gear 16 function as a second rotation mechanism.

The distal portion of the drive shaft 5, the basal portion of the driven shaft 6, the drive gear 15, and the driven gear 16 are arranged between the drive bearings 7 and the driven bearing 8. The drive gear 15 faces towards the driven gear 16. A support (extension shaft) 17, which rotates integrally with the drive shaft 5, is attached to the distal portion of the drive shaft 5. The support 17 is a cap member in the first embodiment.

The basal portion of the driven shaft 6 includes a socket 18 (shaft receiving member), which rotates integrally with the driven shaft 6. The support 17 is received in the socket 18, which is a circular hollow portion. A bushing 19, which functions as a slide bearing, is attached to the inner wall of the socket 18. The bushing 19 rotates integrally with the driven shaft 6. The support 17 is fitted to the bushing 19 with a fit tolerance corresponding to a running fit. In other words, a slight gap resulting from the fit tolerance is defined between the outer surface of the support 17 and the inner surface of the bushing 19.

When the electric motor 3 is activated and the drive shaft 5 is rotated, the rotation of the drive shaft 5, which is reduced by the gear unit 9, is transmitted to the driven shaft 6. The support 17 of the drive shaft 5, the bushing 19, and the socket 18 of the driven shaft 6 support one another and function as a bearing. Thus, there is no need to arrange an exclusive bearing between the drive bearing 7 and the driven bearing 8.

The first embodiment has the advantages described below.

The support 17 and the socket 18 function as a bearing, and the distal end of the drive shaft 5 and the basal end of the driven shaft 6 support each other. This structure eliminates the need for bearings that support the distal end of the drive shaft 5 and the basal end of the driven shaft 6 between the drive gear 15 and the driven gear 16. Accordingly, the distance between the drive gear 15 and the driven gear 16 may be decreased. This enables reduction of the size of the gear transmission device 4 in the axial direction of the drive shaft 5.

The bushing 19 is fitted to the socket 18 with a fit tolerance corresponding to an interference fit. Thus, the bushing 19 does not rotate relative to the socket 18. However, the support 17 is loosely fitted (running fit) to the bushing 19. Thus, even if the shafts 5 and 6 rotate at different speeds, the support 17 and the socket 18 do not interfere with the relative rotation of the shafts 5 and 6. Accordingly, the shafts 5 and 6 rotate smoothly.

A second embodiment of the present invention will now be described centering on points differing from the first embodiment. The second embodiment is directed to a reduction device, which is independent from a motor and which incorporates the gear transmission device 4. In the second embodiment, the drive shaft 5 has an end portion functioning as the support 17. The second embodiment differs from the first embodiment only in this point.

It should be apparent to those skilled in the art that the present invention may be embodied in many other specific forms without departing from the spirit or scope of the invention. Particularly, it should be understood that the present invention may be embodied in the following forms.

A rolling bearing may be used in lieu of the bushing 19.

Instead of a reduction gear mechanism, the gear transmission device 4 may include a speed increasing gear that increases the rotation speed of the drive shaft 5 and rotates the chuck 2 with the increased speed.

The gear transmission device 4 may include a transmission member other than a gear.

In the first and second embodiments, the bushing 19 is arranged between the support 17 of the drive shaft 5 and the socket 18 of the driven shaft 6. This structure may be modified as described in the following paragraphs (1) to (5).

(1) The support 17 may be arranged on or formed at a boss of the drive gear 15. In this case, the support 17 of the drive gear 15 is inserted in the socket 18 of the driven shaft 6. Further, the bushing 19 is arranged between the support 17 and the socket 18.

(2) The socket 18 may be arranged in or formed at a boss of the driven gear 16. In this case, the support 17 of the drive shaft 5 is inserted in the socket 18 of the driven gear 16. Further, the bushing 19 is arranged between the support 17 and the socket 18.

(3) The support 17 may be arranged on or formed at a boss of the drive gear 15. Further, the socket 18 may be arranged on or formed in a boss of the driven gear 16. In this case, the support of the drive gear 15 is inserted in the socket 18 of the driven gear 16. Further, the bushing 19 is arranged between the support 17 and the socket 18.

(4) The bushing 19 may be eliminated. In this case, the support 17 is directly and rotatably supported by the socket 18 with a fit tolerance corresponding to a running fit. In other words, a slight gap resulting from the fit tolerance is defined between the outer surface of the support 17 and the inner surface of the socket 18.

(5) The support 17 may be arranged in a boss of the driven gear 16 or the driven shaft 6. In this case, the socket 18 is formed in the boss of the drive gear 15 or the drive shaft 5.

The present examples and embodiments are to be considered as illustrative and not restrictive, and the invention is not to be limited to the details given herein, but may be modified within the scope and equivalence of the appended claims.

What is claimed is:

1. A gear transmission device comprising:
   a first rotation mechanism including an input shaft having a rotation axis and a drive gear rotated integrally with the input shaft;
   a second rotation mechanism including an output shaft rotated coaxially relative to the input shaft and a driven gear driven by the drive gear and rotated integrally with the output shaft;
   a support attached to the input shaft of the first rotation mechanism and rotated integrally with the input shaft;
   a socket, attached to the output shaft of the second rotation mechanism and rotated integrally with the output shaft, the socket being affanged between the support and the output shaft and including a hollow portion for rotatably receiving the support;
   a bushing fitted to the hollow portion of the socket and to the support with a fit tolerance corresponding to a running fit so that the support is moveable relative to the bushing; and
   wherein the input shaft includes a distal portion, and the output shaft includes a basal portion facing towards the distal portion of the input shaft, the support being defined by a cap member arranged on the distal portion of the input shaft, and the socket being formed in the basal portion of the output shaft.

2. The gear transmission device according to claim 1, wherein mating of the socket and the support results in the input shaft and the output shaft supporting each other.

3. The gear transmission device according to claim 1, wherein the support is in contact with an inner surface of the hollow portion in a movable manner.

4. The gear transmission device according to claim 1, further comprising:
   a gear unit, having a rotation axis parallel to the rotation axis of the input shaft, for reducing rotation speed of the input shaft to rotate the output shaft with a reduced speed.

5. A gear transmission device comprising:
   an input shaft having a rotation axis and a distal portion;
   an output shaft rotated coaxially relative to the input shaft and having a basal portion facing towards the distal portion of the input shaft;
   a support attached to the input shaft and rotated integrally with the input shaft;

a socket, attached to the output shaft and rotated integrally with the output shaft, the socket being arranged between the support and the output shaft and including a hollow portion for rotatably receiving the support; and a bushing fitted to the hollow portion of the socket and to the support with a fit tolerance corresponding to a running fit so that the support is movable relative to the bushing, wherein the support is defined by a cap member arranged on the distal portion of the input shaft, and the socket is formed in the basal portion of the output shaft.

6. The gear transmission device according to claim 5, further comprising:

a gear unit, having a rotation axis parallel to the rotation axis of the input shaft, for reducing rotation speed of the input shaft to rotate the output shaft with a reduced speed, the gear unit including reduction gears respectively meshing with the drive gear and the driven gear to rotate in cooperation with the input shaft.

7. A power tool for use with a tool member, the power tool comprising:

a chuck for detachable fixing the tool member;

a motor for rotating the chuck;

an input shaft rotated in cooperation with the motor;

an output shaft rotated in cooperation with the chuck; and a gear transmission device, arranged between the input shaft and the output shaft, for transmitting rotation of the input shaft to the output shaft and coaxially rotating the output shaft and the input shaft, the gear transmission device including:

a first rotation mechanism including the input shaft and a drive gear rotated integrally with the input shaft;

a second rotation mechanism including the output shaft and a driven gear rotated integrally with the output shaft;

a support attached to the input shaft of the first rotation mechanism and rotated integrally with the input shaft;

a socket attached to the output shaft of the second rotation mechanism and rotated integrally with the output shaft, the socket being arranged between the support and the output shaft and including a hollow portion for rotatably receiving the support; and a bushing fitted to the hollow portion of the socket and to the support with a fit tolerance corresponding to a running fit so that the support is movable relative to the bushing, wherein the input shaft includes a distal portion, and the output shaft includes a basal portion facing towards the distal portion of the input shaft, the support being defined by a cap member arranged on the distal portion of the input shaft, and the socket being formed in the basal portion of the output shaft.

* * * * *